(12) United States Patent
Olson et al.

(10) Patent No.: US 12,029,307 B2
(45) Date of Patent: Jul. 9, 2024

(54) THREE-DIMENSIONAL FOAM REPLACEMENT

(71) Applicant: The North Face Apparel Corp., Wilmington, DE (US)

(72) Inventors: Cory Michael Olson, Golden, CO (US); Jeffrey Allen Dorton, Dublin, CA (US)

(73) Assignee: The North Face Apparel Corp., Wilmington, DE (US)

( * ) Notice: Subject to any disclaimer, the term of this patent is extended or adjusted under 35 U.S.C. 154(b) by 95 days.

(21) Appl. No.: 17/642,443

(22) PCT Filed: Sep. 11, 2020

(86) PCT No.: PCT/US2020/050319
§ 371 (c)(1),
(2) Date: Mar. 11, 2022

(87) PCT Pub. No.: WO2021/050820
PCT Pub. Date: Mar. 18, 2021

(65) Prior Publication Data
US 2022/0338609 A1    Oct. 27, 2022

Related U.S. Application Data

(60) Provisional application No. 62/900,065, filed on Sep. 13, 2019.

(51) Int. Cl.
*A45F 3/12*    (2006.01)
*A45C 13/30*    (2006.01)
*B33Y 80/00*    (2015.01)

(52) U.S. Cl.
CPC ............... *A45F 3/12* (2013.01); *A45C 13/30* (2013.01); *A45F 2003/125* (2013.01); *B33Y 80/00* (2014.12)

(58) Field of Classification Search
CPC .............. A45F 3/12; B33Y 80/00; B32B 5/18
See application file for complete search history.

(56) References Cited

U.S. PATENT DOCUMENTS 5,961,019 A * 10/1999 Gleason .................... A45F 3/12
224/264
7,004,363 B2 * 2/2006 Fenton ...................... B32B 3/30
224/264
(Continued)

FOREIGN PATENT DOCUMENTS

CN    1636482 A    7/2005
CN    106998847 A    8/2017
(Continued)

OTHER PUBLICATIONS

International Search Report and Written Opinion dated Jan. 15, 2021 for PCT Application No. PCT/US2020/050319; 18 pages.

(Continued)

*Primary Examiner* — Justin M Larson
(74) *Attorney, Agent, or Firm* — Smith, Gambrell & Russell LLP

(57) ABSTRACT

Articles are described herein. An example article may comprise a first surface comprising a first lattice. The example article may comprise a second surface at least partially spaced from the first surface. The second surface may comprise a second lattice. The first surface and the second surface may define a cavity therebetween. The first surface and the second surface may be formed as a unitary body. A configuration of the first interconnected struts, the second interconnect struts, and the third struts may be tunable to control a stiffness and ventilation of the example article.

15 Claims, 3 Drawing Sheets

(56) References Cited

U.S. PATENT DOCUMENTS

| | | | | |
|---|---|---|---|---|
| 8,628,067 | B2* | 1/2014 | Pearce | A47C 27/16 |
| | | | | 5/655.5 |
| 8,784,982 | B2* | 7/2014 | Pearce | C08J 9/42 |
| | | | | 427/508 |
| 8,822,011 | B2* | 9/2014 | Gingo | B32B 5/26 |
| | | | | 428/140 |
| 8,932,692 | B2* | 1/2015 | Pearce | B32B 3/12 |
| | | | | 428/36.1 |
| 9,604,442 | B2* | 3/2017 | Kim | B32B 9/025 |
| 9,629,397 | B2* | 4/2017 | Toronjo | A41D 31/285 |
| 9,883,717 | B2* | 2/2018 | Jarvis | A43B 23/0235 |
| 9,925,440 | B2* | 3/2018 | Davis | A43B 1/00 |
| 10,155,855 | B2* | 12/2018 | Farris | A43B 13/14 |
| 10,384,394 | B2* | 8/2019 | McCluskey | B65D 81/1075 |
| 10,549,505 | B2* | 2/2020 | Tibbits | B32B 3/266 |
| 10,696,009 | B2* | 6/2020 | Berger | E04B 1/30 |
| 10,793,693 | B2* | 10/2020 | Farris | B29C 44/3453 |
| 11,019,942 | B1* | 6/2021 | Zucker | B32B 3/02 |
| 11,192,322 | B2* | 12/2021 | Berger | E04C 2/365 |
| 11,224,265 | B2* | 1/2022 | Jarvis | A43B 13/41 |
| 11,266,191 | B2* | 3/2022 | Toronjo | B32B 27/08 |
| 11,292,186 | B2* | 4/2022 | Poelma | B29C 64/40 |
| 11,304,471 | B2* | 4/2022 | Light | B29C 64/10 |
| 11,352,476 | B2* | 6/2022 | Farris | B29C 44/3453 |
| 11,731,389 | B2* | 8/2023 | Gu | B33Y 10/00 |
| | | | | 428/594 |
| 11,766,813 | B2* | 9/2023 | Farris | B29C 64/00 |
| | | | | 264/50 |
| 11,779,821 | B2* | 10/2023 | Davis | A63B 59/51 |
| | | | | 2/425 |
| 11,794,084 | B2* | 10/2023 | Davis | A43B 1/00 |
| 2005/0138717 | A1 | 6/2005 | Le Gal | |
| 2005/0252942 | A1* | 11/2005 | Nykoluk | A45F 3/12 |
| | | | | 224/643 |
| 2016/0122493 | A1 | 5/2016 | Farris et al. | |
| 2018/0264718 | A1 | 9/2018 | McClusky | |
| 2019/0161591 | A1 | 5/2019 | Farris et al. | |
| 2020/0154803 | A1* | 5/2020 | Goulet | A42B 3/124 |
| 2020/0324444 | A1* | 10/2020 | Farris | B29C 44/348 |
| 2020/0359744 | A1* | 11/2020 | Jarvis | A43D 1/025 |
| 2021/0187897 | A1* | 6/2021 | Reinhall | B32B 27/08 |
| 2021/0204679 | A1* | 7/2021 | Li | A45F 3/12 |
| 2021/0323263 | A1* | 10/2021 | Cagle | B32B 15/14 |
| 2022/0118689 | A1* | 4/2022 | Poelma | B29C 64/40 |
| 2022/0256999 | A1* | 8/2022 | Kaiser | A45F 3/04 |
| 2022/0332567 | A1* | 10/2022 | Olson | A41G 11/02 |
| 2022/0338609 | A1* | 10/2022 | Olson | A45C 13/30 |
| 2023/0294578 | A1* | 9/2023 | Takahashi | B29C 64/00 |
| | | | | 428/118 |
| 2023/0339152 | A1* | 10/2023 | Fischer | B32B 5/32 |

FOREIGN PATENT DOCUMENTS

| | | |
|---|---|---|
| CN | 115279227 B | 3/2024 |
| JP | 2005-168839 A | 6/2005 |
| JP | 2015-226573 A | 12/2015 |
| KR | 1020150125180 A | 11/2015 |
| KR | 10-2017-0081224 A | 7/2017 |

OTHER PUBLICATIONS

Office Action received for Vietnamese Patent Application No. 1-2022-02141, mailed on Mar. 29, 2024, 3 pages (1 page of English Translation and 2 pages of Original Document).

* cited by examiner

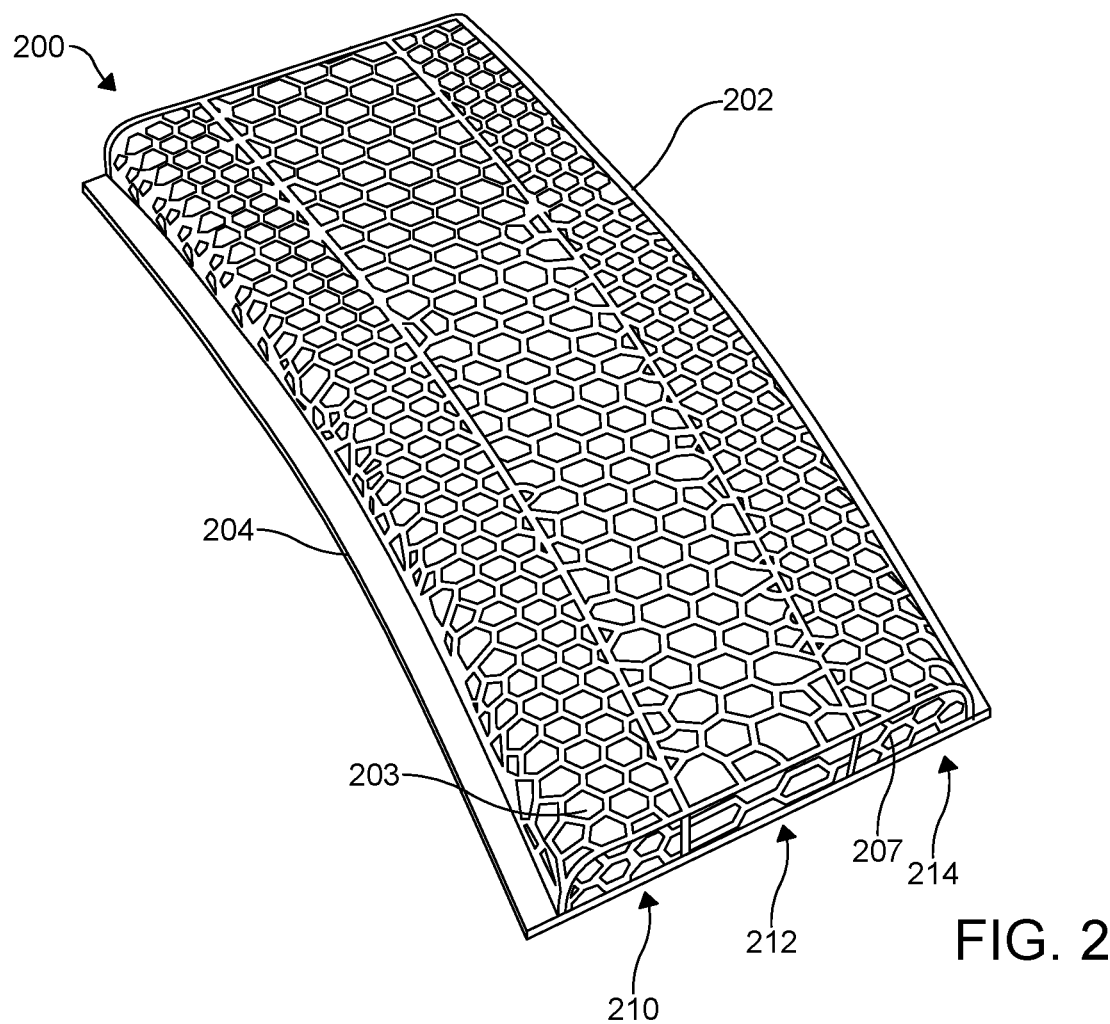
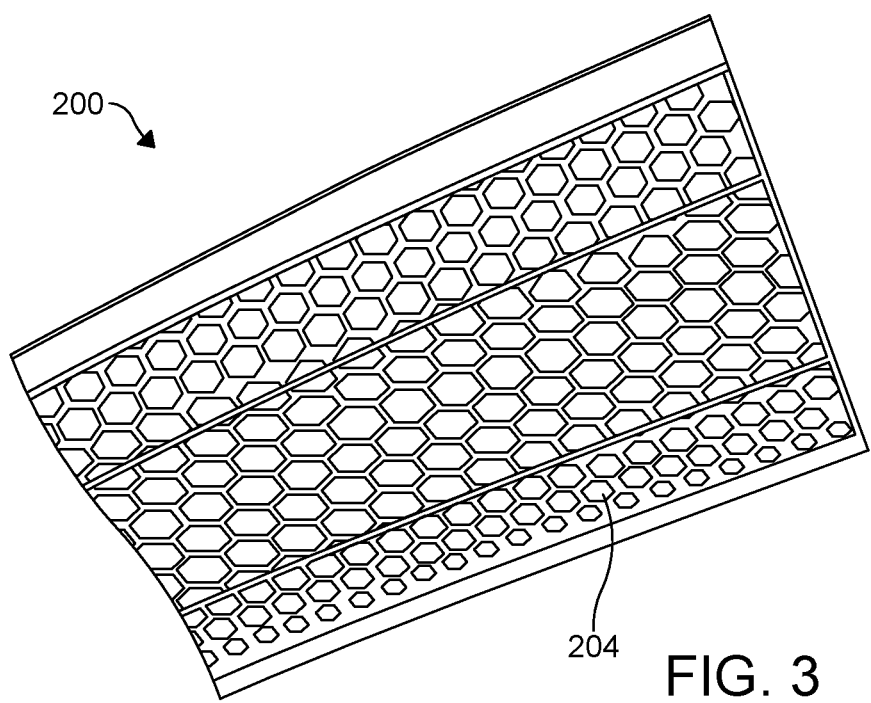

THREE-DIMENSIONAL FOAM REPLACEMENT

CROSS-REFERENCE TO RELATED APPLICATIONS

This application is a U.S. National Stage Application filed under 35 U.S.C. § 371(a) of International Patent Application Serial No. PCT/US2020/050319, filed Sep. 11, 2020, which claims the benefit of and priority to U.S. Provisional Application No. 62/900,065 filed Sep. 13, 2019, each of which are hereby incorporated by reference in its entirety.

BACKGROUND

Items, such as backpacks, may comprise body adjacent components, such as shoulder straps, back panels, etc. The body adjacent components may need foam. Foam may be too rigid to reside comfortably adjacent a body. Additionally, foam may not be porous enough to let air through, making a wearer uncomfortably hot. Therefore, a more breathable, comfortable foam replacement is needed.

SUMMARY

Straps are described herein. An example strap may comprise a first surface comprising a plurality of first interconnected struts that define a plurality of first apertures through the first surface. The example strap may comprise a second surface at least partially spaced from the first surface. The first surface may comprise a plurality of second interconnected struts that define a plurality of second apertures through the second surface. The example strap may comprise one or more third struts disposed between the first surface and the second surface and coupled to at least one of the first surface and the second surface. The first surface and the second surface may define a cavity therebetween. The one or more third struts may be disposed within or adjacent the cavity. The first surface and the second surface may be formed as a unitary body. A configuration of the first interconnected struts, the second interconnect struts, and the third struts may be tunable to control a stiffness and ventilation of the example strap.

Articles are described herein. An example article may comprise a first surface comprising a first lattice. The example article may comprise a second surface at least partially spaced from the first surface. The second surface may comprise a second lattice. The first surface and the second surface may define a cavity therebetween. The first surface and the second surface may be formed as a unitary body. A configuration of the first interconnected struts, the second interconnect struts, and the third struts may be tunable to control a stiffness and ventilation of the example article.

BRIEF DESCRIPTION OF THE DRAWINGS

The following drawings show generally, by way of example, but not by way of limitation, various examples discussed in the present disclosure. In the drawings:

FIG. 2 is a top perspective view of an example foam replacement in accordance with the present disclosure.

FIG. 3 is a bottom view of the foam replacement of FIG. 2 in accordance with the present disclosure.

DETAILED DESCRIPTION

Figure 1:
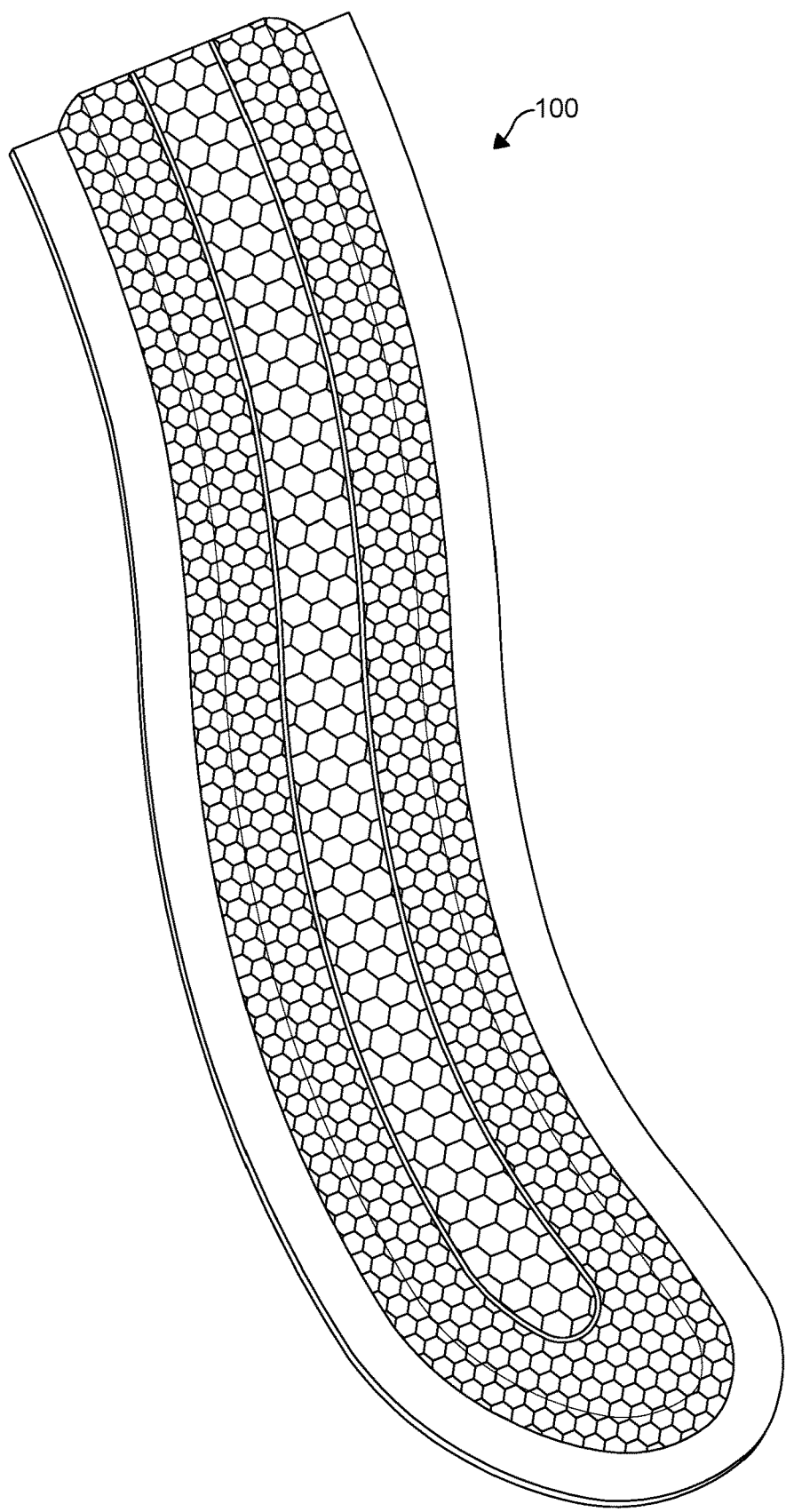
FIG. 1 is a perspective view of a strap in accordance with the present disclosure.

Described herein are three-dimensionally (3D) printed structures that may be used to replace conventional foam shoulder straps and back panels. Described herein are systems, methods, articles, and/or straps to create a more breathable structure that has more comfortable and variable compression throughout the structure. The 3D printed structures may comprise different helical and geometrical components, creating different levels of compression in one structure. Traditionally, close cell foam parts can only be made in one durometer in a single part. The systems, methods, articles, and/or straps described herein may allow for several different levels of tunable compression. The systems, methods, articles, and/or straps described herein may enable printing an open structure that air can easily flow through to the user. The systems, methods, articles, and/or straps described herein may eliminate a lot of the sweating experienced under conventional shoulder straps.

As described herein, air permeability (ventilation) may be tested using ASTM D737; hardness (stiffness) may be tested using ASTM D2240; and flex properties (3 point bend) may be tested using ASTM D790. Various articles or sample sizes may be tested. Other parameters and standards may be used.

Straps are described herein. An example strap may comprise a first surface comprising by a plurality of first interconnected struts that define a plurality of first apertures through the first surface. The first surface may comprise a curvilinear shape. The plurality of first interconnected struts may define a lattice structure. The first surface may be at least partially formed using additive manufacturing. The first surface may comprise at least one first region and at least one second region. Apertures defined in the at least one first region may comprise an average diameter that is less than an average diameter of the apertures defined in the at least one second region. The first surface may comprise at least one first region having a first stiffness and at least one second region having a second stiffness different from the first stiffness. The first surface may comprise a pair of first regions and a second region disposed between the pair of first regions. Apertures defined in the at least one first region may comprise an average diameter that is less than an average diameter of the apertures defined in the at least one second region.

The example strap may comprise a second surface at least partially spaced from the first surface. The first surface may comprise a plurality of second interconnected struts that define a plurality of second apertures through the second surface. The second surface may comprise a curvilinear shape. The plurality of second interconnected struts may define a lattice structure. The second surface may be at least partially formed using additive manufacturing.

The example strap may comprise one or more third struts disposed between the first surface and the second surface and coupled to at least one of the first surface and the second surface. A plurality of the third struts may define a lattice structure.

The first surface and the second surface may define a cavity therebetween. The one or more third struts may be disposed within or adjacent the cavity. The first surface and the second surface may be formed as a unitary body. A configuration of the first interconnected struts, the second interconnect struts, and the third struts may be tunable to control a stiffness and ventilation of the example strap.

The example article may comprise a first layer disposed to cover at least a portion of the first surface. The example article may comprise a second layer disposed to cover at least a portion of the second surface.

Articles are described herein. An example article may comprise a first surface comprising a first lattice. The first surface may comprise a curvilinear shape. The first surface may be at least partially formed using additive manufacturing. The first surface may comprise at least one first region and at least one second region. Apertures defined in the at least one first region may comprise an average diameter that is less than an average diameter of the apertures defined in the at least one second region. The first surface may comprise at least one first region having a first stiffness and at least one second region having a second stiffness different from the first stiffness. The first surface may comprise a pair of first regions and a second region disposed between the pair of first regions. Apertures defined in the at least one first region may comprise an average diameter that is less than an average diameter of the apertures defined in the at least one second region.

The example article may comprise a second surface at least partially spaced from the first surface. The second surface may comprise a second lattice. The second surface may comprise a curvilinear shape. The second surface may be at least partially formed using additive manufacturing.

The first surface and the second surface may define a cavity therebetween. The first surface and the second surface may be formed as a unitary body. A configuration of the first interconnected struts, the second interconnect struts, and the third struts may be tunable to control a stiffness and ventilation of the example article.

The example article may comprise a first layer disposed to cover at least a portion of the first surface. The example article may comprise a second layer disposed to cover at least a portion of the second surface.

FIG. 1 shows an example support structure 100 that may comprise at least a portion of a strap. The structure 100 may form part of an item such as a bag with a shoulder strap, a back brace or backpack. The structure 100 may be formed as a unitary body, for example, using additive manufacturing. The structure 100 may comprise a plurality of lattice regions. The lattice regions may be configured to define one or more patterns of struts and apertures. As an example, the structure 100 may comprise a plurality of lattice patterns configured to provide various stiffness and/or breathability. Since the structure 100 may be formed as a unitary body, the configuration of the various lattice regions can be used to provide selective control of properties of the structure.

FIGS. 2-3 illustrate an example foam replacement 200 which may be formed as a unitary body using additive manufacturing. The foam replacement 200 may have a first surface 202 and a second surface 204 at least partially spaced from the first surface 202. As shown in FIGS. 2-3, the first surface 202 may comprise a curvilinear shape and the second surface 204 may comprise a substantially rectangular planar shape. The first surface 202 and the second surface 204 may comprise interconnected struts 203 or lattice structures. The first surface 202 and second surface 204 may define a cavity 207 between them and struts 203 may be disposed within or adjacent the cavity 207. The configuration of struts 203 may be tunable to control a stiffness and ventilation of the foam replacement 200. As shown in FIG. 2, the foam replacement 200 may comprise a plurality of regions 210, 212, 214. A region 210, 212, 214 may comprise a plurality of apertures. For example, the average diameter of the apertures in one region 210 may differ from the average diameter of the apertures in a different region 212, 214. The stiffness and/or breathability of one region 210, 212, 214 may be different from the stiffness and/or breathability in another region 210, 212, 214.

Figure 4:
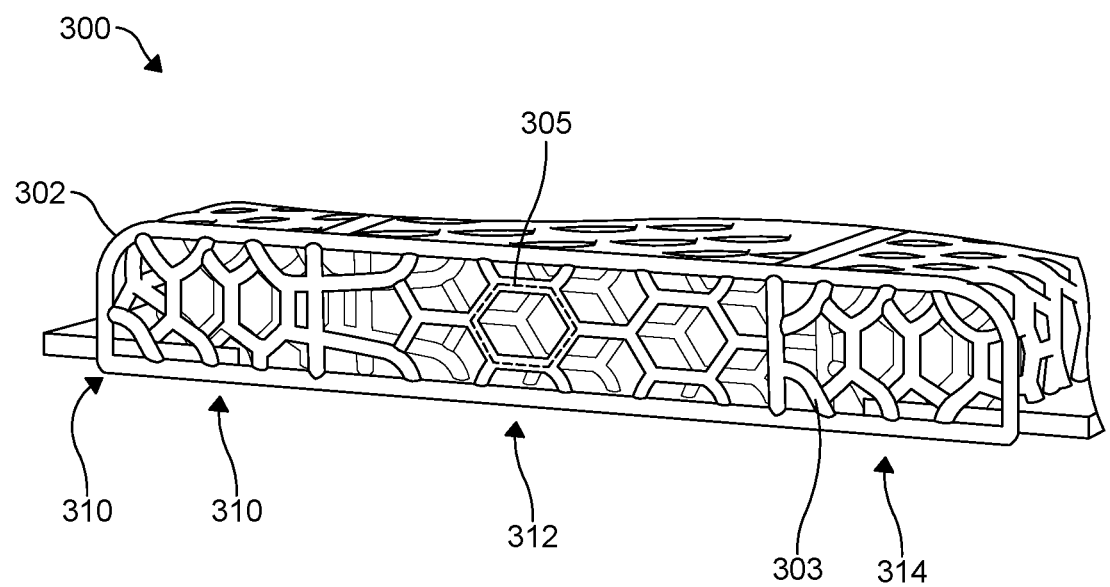
FIG. 4 is a side perspective view of a foam replacement in accordance with the present disclosure.

FIG. 4, illustrate a portion of an example foam replacement 300 which may be formed as a unitary body using additive manufacturing. The foam replacement 300 may have a first surface 302 and a second surface 304 at least partially spaced from the first surface 302. The first surface 302 may comprise a curvilinear shape and the second surface 304 may comprise a substantially rectangular planar shape. The first surface 302 and the second surface 304 may comprise a plurality of interconnected struts 303 that define a plurality of apertures 305 through the first surface 302 and the second surface 304. The apertures 305 may comprise geometric shapes such as hexagons and pentagons or they may comprise other shapes. Additional struts 303 may be disposed in a cavity 307 between the first surface 302 and the second surface 304. A plurality of interconnected struts 303 may comprise a lattice structure. As shown in FIG. 4, the foam replacement 300 may comprise a plurality of regions 310, 312, 314. A region 310, 312, 314 may comprise a plurality of apertures 305 with similar average diameters. For example, the average diameter of the apertures 305 in one region 310 may differ from the average diameter of the apertures 305 in a different region 312, 314. The stiffness of one region 310 may be different from the stiffness in another region 312, 314. Various diameters and configurations may be used to control stiffness and breathability among the regions 310, 312, 314. As shown, the central region 312 may be more breathable and less stiff compared to the outer regions 312, 314.

What is claimed is:

1. A strap comprising:
    a first surface comprising a plurality of first interconnected struts that define a plurality of first apertures through the first surface, wherein the first surface comprises a first region and at least one second region, wherein the first region is a central region and the at least one second region is an outer region disposed radially outwardly from the first region;
    a second surface at least partially spaced from the first surface, the first second surface comprising a plurality of second interconnected struts that define a plurality of second apertures through the second surface; and
    one or more third struts disposed between the first surface and the second surface and coupled to at least one of the first surface and the second surface,
    wherein the first surface and the second surface define a cavity therebetween,
    wherein the one or more third struts are disposed within or adjacent the cavity,
    wherein the first surface and the second surface are formed as a unitary body,
    wherein a configuration of the first interconnected struts, the second interconnected struts, and the one or more third struts is tunable to control a stiffness and ventilation of the strap such that the stiffness of the central region is less than the stiffness of the outer region when measured using ASTM D2240 and the ventilation of the central region is greater than the ventilation of the outer region when measured using ASTM D737, and
    wherein the strap forms part of a backpack.

2. The strap of claim 1, wherein apertures defined in the first region have an average diameter that is less than an average diameter of the apertures defined in the at least one second region.

3. The strap of claim 1, wherein one or more of the first surface or the second surface has a curvilinear shape.

4. The strap of claim 1, wherein the first surface is at least partially formed using additive manufacturing.

5. The strap of claim 1, wherein the second surface is at least partially formed using additive manufacturing.

6. The strap of claim 1, further comprising a first layer disposed to cover at least a portion of the first surface.

7. The strap of claim 1, further comprising a second layer disposed to cover at least a portion of the second surface.

8. A method of making the strap of claim 1.

9. An article comprising:
a first surface comprising a first lattice; and
a second surface at least partially spaced from the first surface, the second surface comprising a second lattice;
wherein the first surface and the second surface define a cavity therebetween,
wherein the first surface and the second surface are formed as a unitary body, wherein the first surface comprises a first region and at least one second region,
wherein the first region is a central region and the at least one second region is an outer region disposed radially outwardly from the first region, wherein a configuration of the first region and the at least one second region is tunable to control a stiffness and ventilation of the strap such that the stiffness of the central region is less than the stiffness of the outer region when measured using ASTM D2240 and the ventilation of the central region is greater than the ventilation of the outer region when measured using ASTM D737, and
wherein the strap forms part of a backpack.

10. The article of claim 9, wherein apertures defined in the first region have an average diameter that is less than an average diameter of the apertures defined in the at least one second region.

11. The article of claim 9, wherein one or more of the first surface or the second surface has a curvilinear shape.

12. The article of claim 9, wherein the first surface is at least partially formed using additive manufacturing.

13. The article of claim 9, wherein the second surface is at least partially formed using additive manufacturing.

14. The article of claim 9, further comprising a first layer disposed to cover at least a portion of the first surface.

15. The article of claim 14, further comprising a second layer disposed to cover at least a portion of the second surface.

* * * * *